UNITED STATES PATENT OFFICE.

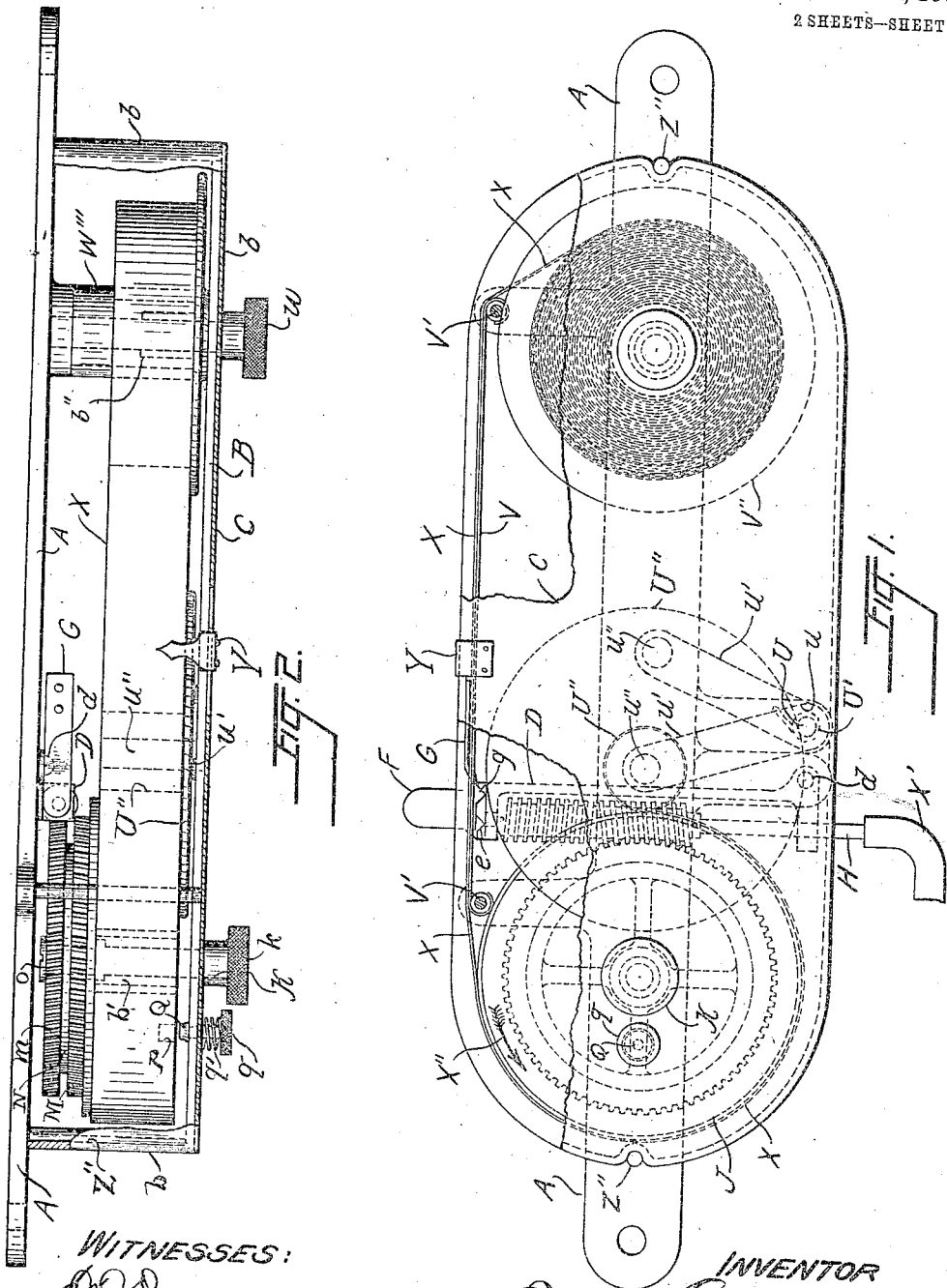

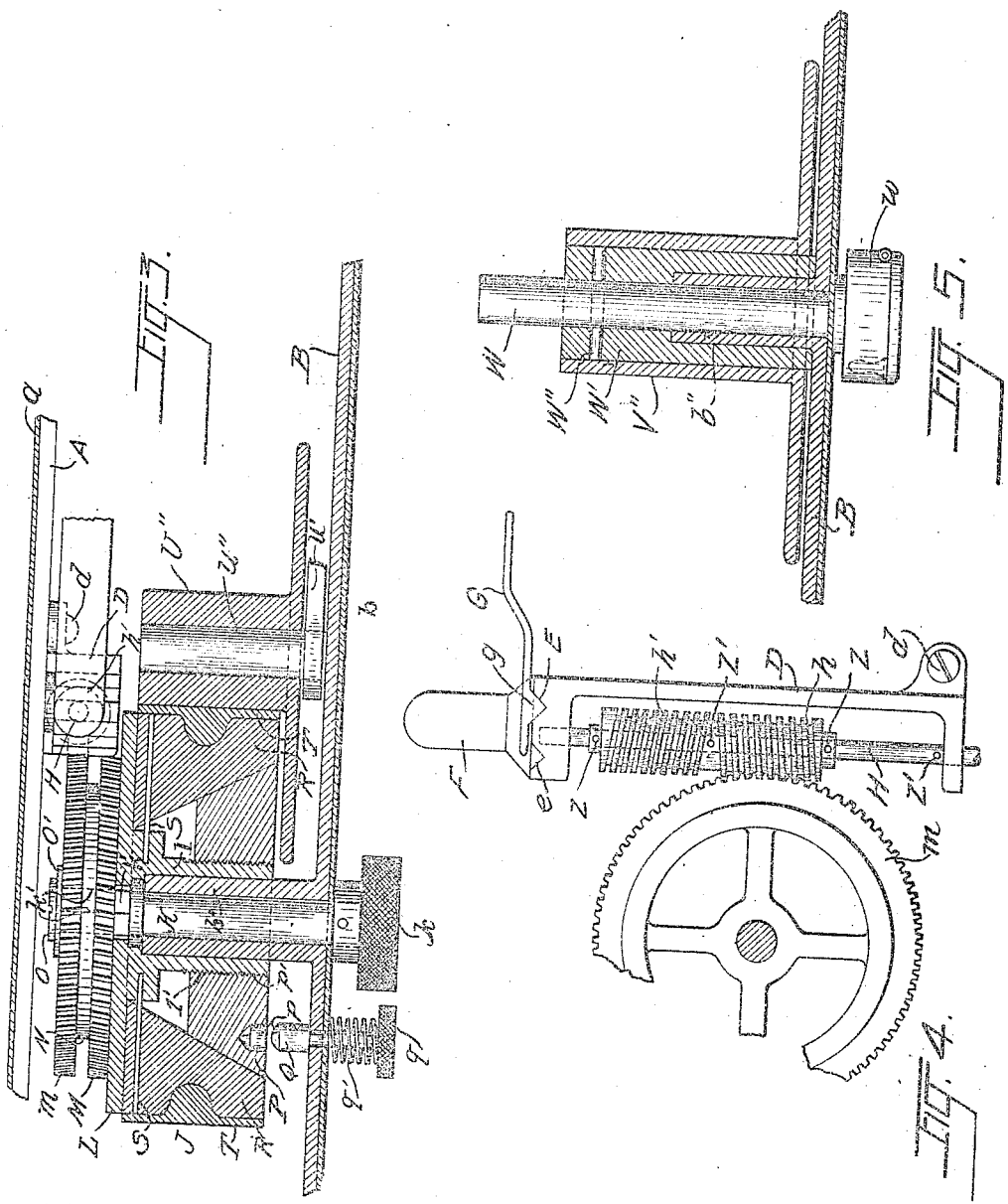

OTTO CULLMAN, OF CHICAGO, ILLINOIS.

MACHINE FOR OPERATING ROUTE-GUIDES, RIBBON-MAPS, AND THE LIKE.

961,288. Specification of Letters Patent. Patented June 14, 1910.

Application filed February 23, 1909. Serial No. 479,493.

*To all whom it may concern:*

Be it known that I, OTTO CULLMAN, a citizen of the United States, and a resident of Chicago, in the county of Cook and State of Illinois, have invented certain new and useful Improvements in Machines for Operating Route-Guides, Ribbon-Maps, and the Like, of which the following, when taken in connection with the drawing accompanying and forming a part hereof, is a full and complete description, sufficient to enable those skilled in the art to which it pertains to understand, make, and use the same.

This invention relates to a mechanism whereby ribbon maps or route guides for travelers in wheeled vehicles on roads or highways are moved a scaled distance corresponding with the actual distance traveled by the vehicle to which the device is attached and by which it is actuated. And the object of the invention is to obtain, in a mechanism arranged to move a ribbon map or route guide by the movement of the vehicle so as to successively expose to view the several objects indicated thereon, a device which will permit from time to time, and at any time, easy adjustment of the position of the map; whereby by referring to marks thereon, the location of the party using the map is exposed to view in a manner which will not require a skilled person or one familiar with the use of maps, to read or understand the same.

A further object of the invention is to obtain a device arranged to move a map or route guide which will be compact, and which will at all times present a sufficient portion of the map or route guide in position for reference by the driver of the vehicle to permit him to locate the vehicle, and which, while simple in construction, durable and easily manipulated, will permit of a plurality of means of correcting any variation of the movement of the device from the actual movement of the vehicle to which the device is attached.

A further object of the invention is to obtain a device which can be easily adjusted to correspond with the variation in peripheral length of rubber tires made to fit wheels of the same diameter by different makers, and with the variation in peripheral length of tires due to wear or to the different degree of inflation of tires of different automobiles.

A further object of the invention is to obtain a device in which a ribbon route guide or road map may be easily inserted and from which a route guide or road map may be readily taken.

A further object of the invention is to obtain a device provided with mechanism to actuate a route guide or map which can be readily thrown out of and into operation when desired.

Other results are obtained by me which are fully set out in the description and illustration herein of a device embodying the invention.

In the drawings referred to Figure 1 is an elevation of a device embodying the invention, with a portion of the casing removed to expose the operating mechanism to view. Fig. 2 is a top plan view of a device embodying the invention, with a portion of the top of the casing removed to expose to view the mechanism of the device. Fig. 3 is a section of the driven spool, showing the driving mechanism of the device. Fig. 4 is an elevation of the sub-base, shaft and worm journaled therein and of the worm wheel of the device. Fig. 5 is a section of the driven spool and the shaft and hub on which such spool is frictionally mounted.

A reference letter applied to designate a given part is used to indicate such part throughout the several figures of the drawings wherever the same appears.

The mechanism of this device is contained in a two part case, such parts being separable. The stationary part of the case includes base A and back *a*. The removable part of the case includes base B and the shell *b* attached to such base B.

D is a sub-base pivotally attached to base A as by screw *d*.

E, *e*, are recesses in the upper end of sub-base D, and F is the portion of such sub-base which extends above the top of the device to form a handle by means of which the sub-base may be moved for the purpose hereinafter set forth.

G is a spring provided with head *g*.

H is a shaft rotatably mounted in sub-base D.

*h, h'*, are worm gears secured on shaft H, to turn therewith as by pins $z$, $z$, in holes $z'$, $z'$.

Head $g$ is arranged to alternately fit in recesses E, $e$, as the sub-base D is moved on pivot $d$ to force one of the worms $h$, $h'$, into or out of engagement with its corresponding worm gear wheel, (M, $m$).

J is a driven roller or wheel rotatably mounted on base B. Roller J is expansible and consists of the following named parts:— Shaft K is the shaft of wheel J and is provided with thumb wheel $k$. Shaft K is rotatably mounted in bearing $b'$ of part B. The end $k'$ of shaft K is squared. Worm gear wheels M, $m$, and washer N are all mounted on the squared end of shaft K and are held in position thereon by screw O.

O' is a washer interposed between screw O and the worm gear wheel adjacent thereto on part $k'$ of shaft K. The hub $l$ of disk L is provided with screw threads $l'$.

P is a frustum provided with one or more recesses $p$ on the larger end thereof and provided with an axial aperture having internal screw threads $p'$ corresponding with screw threads $l'$ and such frustum P is mounted on hub $l$ by means of these screw threads.

Q is a pin provided with head $q$ and mounted in the base B with spring $q'$ arranged to yieldingly hold it in a retracted position and out of engagement with recesses $p$ in part P. Pressure on head $q$ forces pin Q against part P and when a recess $p$ is in the path of movement of pin Q such pin enters the recess and part P cannot be rotated. Rotation of the shaft K at such time (as by means of thumb wheel $k$), rotates the hub $l$ and moves the frustum P longitudinally on said hub $l$. Parts R are mounted on the frustum P. I prefer to use not less than four of the parts R and to hold such parts from rotating relative to the disk L and part P by means of pins S, S, which fit loosely in holes in parts R, respectively, and are driven into holes provided therefor in hub $l$.

T is a band of rubber or other expansible material on parts R, R, the outside of such band forming the periphery of driving roller J.

When driving roller J is constructed as described and rotatably mounted in sleeve $b'$ the diameter of the roller may be made larger or smaller than a given size by turning thumb wheel $k$ and at the same time forcing the pin Q into recess of part P, as by so doing the hub $l$ is rotated and the part P is held stationary so that such part P is moved longitudinally by means of the screw threads on the hub $l$ and the band T takes up and expands for any and all variation obtained in the diameter of the driving roller J.

U, Fig. 1, is a pin rigidly secured in base B and $u$ is a hub rotatably mounted on pin U.

$u'$ is an arm rigidly mounted on hub $u$ and $u''$ is a pin rigidly mounted in arm $u'$ at the free end of such arm.

U' is a spring on hub $u$ arranged to force the free end of the arm $u'$ against the driving roller J and U'' is a spool on pin $u''$. Spool U'' is arranged to hold thereon a ribbon map or guide, as X, Fig. 1. Said ribbon guide X extends around the driving roller J and is attached to the spool U''. When shaft H is rotated as by flexible connection X' rotation of the driving roller J in the direction indicated by the arrow X'' draws the ribbon X over the table V and winds such ribbon on spool U''.

V', V', are pins rigidly secured in base B on which table V is mounted and V'' is the storage spool from which the ribbon X is unwound as it is drawn over the table V by driving roller J.

W is a shaft provided with thumb wheel $w$ rotatable in bearings $b''$ on base B, and W' is a hub secured to shaft W as by pin W'' to rotate with said shaft.

The hub or spool V'' is provided with a hole fitting closely to the hub W' so that when the thumb wheel W is turned the ribbon may be loosened from or wound onto such spool V'' (see Fig. 5).

When it is desired to wind the ribbon onto the spool V'' in the manner last above described it is simply necessary to move handle F so as to disengage the worm $h$ or $h'$ from the worm gear wheel I.

Y is an arrow movably mounted on base B adjacent to table V. The arrow Y may be slid so as to vary the point indicated thereby on the ribbon or map X passing over and lying upon the table V. By means of the thumb wheels $k$ and $w$ the ribbon on spools U'' and V'' may be moved forward and backward on table V without reference to the movement of the driving wheel J, but with the driving worm and wheel out of engagement, and such thumb wheels therefore form means of adjusting the map on the table in order to correct any disagreement between the travel of the ribbon corresponding with the travel of the vehicle that is, to correctly position the vehicle on the map, and the arrow Y forms additional means to correct any variation from the desired relative travel of the vehicle and map, and to correctly position said vehicle on said map.

A plurality of worms $h$, $h'$, and worm gears M, $m$, are employed so as to give a right or left connection to shaft H. By the connection in Fig. 1 the shaft H moving in a given direction turns the worm wheel $m$ and roller J in the direction indicated by the arrow. By disengaging worm *h* from worm wheel *m* and changing the position of the worms and worm gear wheels so that worm wheel *h'* engages with gear wheel M movement of the roller J in the direction indicated by the arrow X'' requires a reverse movement of the shaft H. The described change in position of worm *h*, *h'*, is obtained by removing the pins Z, Z, and dropping the worms *h*, *h'*, on shaft H and reinserting said pin in apertures Z' (see Fig. 4). The removal of screw O and washer O' from shaft K permits gears M, *m*, and washer *n* to be taken off of shaft K and replaced thereon in the changed position required. After such change is made they are again secured in place by washer O' and screw O.

When it is desired to change a ribbon on this machine the base B is removed from base A as by drawing it off of pins Z'' Fig. 1. The driving wheel J with the worm wheels M, *m*, and spools U'' and V'' remain on base B of the frame. The sub-base D and shaft H together with the worm *h*, *h'*, and spring G remain on base A. The ribbon having been rewound on spool V'' it is removed from hub W' and a new ribbon and spool placed thereon. The ribbon after being carried around the driving roller J is attached to spool U'' on pin *u''* and yieldingly brought into contact with driving wheel J by the resiliency of the spring *u'*. The part B is then replaced on part A. Base A is provided with holes for screws by means of which the device may be attached to a vehicle.

The rotatable shaft H is journaled in the sub-base D for the reason that when part B is separated from part A of the case, such part B carrying therewith the worm wheels *h*, *h'*, it sometimes occurs, when a new route guide has been put in place on the spools and driving roller and it is then sought to replace part B on part A, that the teeth of the worm wheel do not engage with the worm so as to permit such replacement. In such case, to avoid the necessity of turning the driven roller J by thumb nut *k* the sub-base D is turned to bring the worm into inoperative position until the part B is replaced on part A of the base. The sub-base is then moved on its pivot to bring the worm into operative relation with the worm wheel. The recess *e* at the upper end of the sub-base D and the abutment *g* on spring G are made so large that such abutment *g* is forced by the spring into the recess *e* even if the spirals of the worm are not properly in engagement with the teeth of the worm wheel, and such spring and abutment continuously tend to force such worm and teeth into suitable engagement; and as not more than one turn of the worm is required to bring such worm and worm wheel into proper relation to engage, when the shaft H is turned such wheel and gear are soon brought into engagement. Again, when a city or village is on the route designated by the route guide which is in the machine, if it be desired to leave such route temporarily, in order to view such city or village the operation of the device is suspended by moving the sub-base D so that the worm is out of engagement with the worm wheel, and in resuming the route designated the device is again brought into operation by moving said sub-base to again bring the worm and gear into engagement.

Having thus described my invention what I claim as new and desire by Letters Patent is:—

1. An expansible roller, a removable spool, a ribbon, means to yieldingly hold the spool with the outer turn of the ribbon thereon in contact with the roller and a thumb wheel arranged to turn the roller, in combination with a table, a rotatably mounted shaft, arranged to turn loosely, a thumb wheel on said shaft arranged to turn therewith and an additional spool removably mounted on the shaft, the said ribbon attached at its ends to the spools and arranged to lie on the table and move thereover when wound from one to the other of said spools.

2. The combination of a base, an expansible roller rotatably mounted on the base, a thumb wheel arranged to turn the roller, a pin rigidly attached to the base, a hub loosely mounted on the pin, a radially extending arm rigidly attached to one end of the hub, a spool rotatably mounted on the free end of the arm, a spring arranged to hold the spool normally in position so that the outer turn of the ribbon thereon is in contact with the roller, said spring and arm arranged so that the spool can be forced into position to take the outer turn of the ribbon thereon out of contact with the roller, a pin rotatably mounted on the base and a spool on said pin arranged to turn therewith, a thumb wheel on the pin, a ribbon on the spools and arranged to be wound from one thereof onto the other one by rotation of the driven wheel, marks on the ribbon, and movable means to indicate a given one of such marks.

3. A ribbon and a wheeled vehicle, in combination with a frame, a hub pivoted on the frame and an arm on the hub arranged to move with the movement of the hub, spools arranged to wind the ribbon thereon, one of such spools removably and rotatably mounted on the frame to turn loosely and the other of such spools removably and rotatably mounted on the movable arm, and the spools arranged so that a portion of the ribbon between the spools is exposed to view, a roller rotatably mounted on the frame adjacent to the spool which is on the movable arm, driving mechanism arranged to actuate said roller on the rotation of a wheel of the vehicle, means to yieldingly hold the spool on the movable arm with the outer turn of the ribbon thereon against the roller, means whereby disengagement of the driving mechanism may be effected, means to turn said roller and thereby turn the spool adjacent thereto independently of the driving mechanism, means to turn the loosely mounted spool independently of the driving mechanism, marks on the ribbon, and movable means to indicate a given mark, the ribbon and spools arranged so that said turning of the spools independently of the driving mechanism changes the mark which is indicated on the ribbon.

4. A wheeled vehicle, an expansible driving wheel, mechanism arranged to be actuated by one of the wheels of the vehicle and to actuate the driving wheel, a rotatably mounted spool, a ribbon provided with marks thereon attached to said spool, means to yieldingly hold the spool with the outer turn of the ribbon thereon in contact with the driving wheel, in combination with a table, an additional rotatably mounted spool arranged to turn loosely, said ribbon arranged to lie on the table and move thereover when wound from one to the other of the spools, and means to make the indicated marks on the ribbon correspond with the actual position of said vehicle relative to the objects designated by said marks.

5. The combination of a two part case, one of such parts provided with a base, a sub-base movably mounted on said base, journal bearings on the sub-base, a shaft rotatably mounted in the journal bearings, said sub-base arranged to move the shaft into operative or inoperative position, the other of such parts provided with a base and arranged to be joined to the first named part, a shaft rotatably mounted on the last named base and said shaft arranged to be rotated by the rotation of the first named shaft when the two parts of the case are joined and the shaft on the sub-base is in an operative position.

6. A two part case, a shaft, movable journal bearings on one of said parts, said shaft rotatably mounted in said movable journal bearings, ribbon spools and a driven roller rotatably mounted on the other of said parts, said parts of the case separable, means to transmit rotation of the shaft to the driven roller, said means arranged to be forced into and out of engagement after the two parts of the case are joined and to turn the driven roller when in engagement, and to disengage upon the separation of said parts of the case.

7. The combination of a two part case, provided with an aperture, one of said parts arranged to be rigidly attached to a vehicle and the other of said parts arranged to be joined to the first named part and to be separated therefrom, said parts respectively provided with a base, a sub-base mounted on the immovable base, and movable into determined positions, journal bearings on the sub-base, a shaft rotatably mounted in the journal bearings, means to yieldingly hold the sub-base in a determined position, driving mechanism on said shaft and a projection on the sub-base extending through said aperture in the case, a shaft rotatably mounted on the movable base, driven mechanism and a roller on said shaft, the driving mechanism on the shaft in the journal bearings arranged to be engageable with the driven mechanism on the separable part of the case, when the parts of the case are joined, and said sub-base is in one of its determined positions.

8. The combination of a two part case, one of such parts arranged to be rigidly attached to a vehicle and the other of such parts arranged to be joined to the first named part and be separable therefrom, said parts respectively provided with a base, a sub-base provided with a projection thereon mounted on the immovable base, and movable into determined positions by means of said projection, journal bearings on the sub-base, a shaft rotatably mounted in the journal bearings, means to yieldingly hold the sub-base in a determined position on its base, driving mechanism on said shaft, a shaft rotatably mounted on the movable base, a thumb wheel, driven mechanism and a roller on said shaft, said driven mechanism arranged to engage with the driving mechanism when the parts of the case are joined and said sub-base is in one of its determined positions.

9. A two part case, one of said parts provided with a driven wheel, a spool, a ribbon, means to yieldingly hold the spool with the outer turn of the ribbon thereon in contact with the driven wheel, a thumb wheel arranged to turn the driven wheel, such spool arranged so that it can be forced into position to take the outer turn of the ribbon thereon out of contact with the driven wheel, in combination with a table, and an additional rotatably mounted spool arranged to turn loosely, the said ribbon attached at its ends to the spools and arranged to lie on the table and move thereover when wound from one to the other of said spools, and the other of said parts provided with mechanism arranged to actuate the driven wheel when the parts of the case are joined.

10. A two part case, said parts separably joined, a shaft rotatably mounted on one of said parts, ribbon spools and an expansible driven roller rotatably mounted on the other of said parts, means to transmit rotation of the shaft to the driven roller, said means arranged to engage and turn the driven roller when the two parts of the case are joined, and to disengage upon the separation of said parts of the case.

11. The combination of a two part case, one of said parts provided with a base, a sub-base movably mounted on said base, a shaft rotatably mounted in the sub-base, right and left hand worms on the shaft arranged so as to be alternately moved into an operating position, and means to attach such worms to the shaft to turn therewith, and the other of said parts provided with a base and arranged to be joined to the first named part, a shaft rotatably mounted on the last named base and right and left worm gears removably attached to said shaft to turn therewith, said worm gears arranged so as to be alternately placed in operating position relative to the corresponding worm, and means to yieldingly hold the sub-base in position with a worm and a corresponding worm gear in engagement.

12. The combination of a two part case, one of said parts provided with a base, a sub-base movably mounted on said base, a shaft rotatably mounted in the sub-base, right and left hand worms on the shaft arranged so as to be alternately moved into an operating position, and means to attach said worms to the shaft to turn therewith, and the other of said parts provided with a base and arranged to be jointed to the first named part, a shaft rotatably mounted on the last named base and right and left worm gears removably attached to said shaft to turn therewith, said worm gears arranged so as to be alternately placed in operating position relative to the corresponding worm, and a spring arranged to be joined to the first named part, determined position.

13. A two part case, said parts separably joined, a shaft rotatably mounted on one of said parts, ribbon spools and an additional shaft provided with a thumb wheel rotatably mounted on the other of said parts, and a roller on said additional shaft arranged to turn therewith, means to transmit rotation of the first named shaft to the additional shaft, said means arranged to engage and turn the additional shaft when the two parts of the case are joined and to disengage when said parts of the case are separated.

14. The combination of a two part case separably joined and such parts respectively provided with bases, one of said bases arranged to be rigidly attached to a vehicle, a sub-base mounted on said rigidly attached base and movable into determined positions, means to yieldingly hold the sub-base in a determined position, a shaft rotatably mounted in the sub-base, right and left hand worms on the shaft arranged so as to be alternately moved into an operative position, and means to attach such worms to the shaft to turn therewith, a shaft rotatably mounted on the movable base, right and left worm gears removably attached to said shaft to turn therewith and arranged so as to be alternately placed in operative position relative to the corresponding worm, a thumb wheel and a roller rigidly attached to the shaft, a removably mounted rotatable spool yieldingly held in engagement with said roller, an additional shaft rotatably mounted on the movable base, an additional removable spool on said additional shaft, said spools positioned to receive a ribbon to be wound on the spool which is in engagement with the roller and a thumb wheel arranged to turn said last named spool.

15. The combination of a two part case separably joined and such parts respectively provided with bases, one of said bases arranged to be rigidly attached to a vehicle, a sub-base mounted on said rigidly attached base and movable into determined positions, means to yieldingly hold the sub-base in a determined position, a shaft rotatably mounted in the sub-base, right and left hand worms on the shaft arranged so as to be alternately moved into an operative position, and means to attach such worms to the shaft to turn therewith, a shaft rotatably mounted on the movable base, right and left worm gears removably attached to said shaft to turn therewith and arranged so as to be alternately placed in operative position relative to the corresponding worm, a thumb wheel, and a roller rigidly attached to the shaft, a removably mounted rotatable spool yieldingly held in engagement with said roller, an additional shaft rotatably mounted in the removable base, and a spool removably mounted on said last named shaft, said spools positioned to receive a ribbon to be wound on the spool which is in engagement with the roller.

OTTO CULLMAN.

In the presence of—
CHARLES TURNER BROWN,
CORA A. ADAMS.